(12) United States Patent
Stewart et al.

(10) Patent No.: US 7,257,050 B2
(45) Date of Patent: Aug. 14, 2007

(54) THROUGH TUBING REAL TIME DOWNHOLE WIRELESS GAUGE

(75) Inventors: John Stewart, Houston, TX (US); Paul Tubel, The Woodlands, TX (US); Clark J. Bergeron, The Woodlands, TX (US)

(73) Assignee: Shell Oil Company, Houston, TX (US)

( * ) Notice: Subject to any disclaimer, the term of this patent is extended or adjusted under 35 U.S.C. 154(b) by 419 days.

(21) Appl. No.: 10/730,441

(22) Filed: Dec. 8, 2003

(65) Prior Publication Data

US 2005/0121253 A1    Jun. 9, 2005

(51) Int. Cl.
*G01V 3/00* (2006.01)

(52) U.S. Cl. .................. 367/82; 340/854.4; 340/854.5; 340/856.4; 181/108

(58) Field of Classification Search ............. 340/853.3, 340/854.4, 854.5, 856.4; 367/82; 166/254.2, 166/254.1; 181/108
See application file for complete search history.

(56) References Cited

U.S. PATENT DOCUMENTS

| | | | | |
|---|---|---|---|---|
| 3,790,930 | A | * | 2/1974 | Lamel et al. .................. 367/82 |
| 4,992,997 | A | * | 2/1991 | Bseisu .......................... 367/82 |
| 5,914,911 | A | | 6/1999 | Babour et al. ................. 367/82 |
| 5,941,307 | A | | 8/1999 | Tubel ........................... 166/313 |
| 6,070,662 | A | * | 6/2000 | Ciglenec et al. .......... 166/254.1 |
| 6,108,268 | A | | 8/2000 | Moss ............................ 367/82 |
| 6,192,988 | B1 | | 2/2001 | Tubel ........................... 166/313 |
| 6,215,981 | B1 | | 4/2001 | Borchardt et al. ............. 455/42 |
| 6,321,838 | B1 | | 11/2001 | Skinner ................. 166/250.01 |
| 6,464,011 | B2 | | 10/2002 | Tubel ........................... 166/313 |
| 6,614,360 | B1 | | 9/2003 | Leggett, III et al. ..... 340/853.1 |
| 6,679,332 | B2 | | 1/2004 | Vinegar et al. .............. 166/373 |
| 6,697,298 | B1 | | 2/2004 | Dubinsky et al. .............. 367/81 |
| 6,715,550 | B2 | | 4/2004 | Vinegar et al. ......... 166/250.15 |
| 6,896,056 | B2 | * | 5/2005 | Mendez et al. ........... 166/254.2 |
| 6,912,177 | B2 | * | 6/2005 | Smith ........................... 367/82 |
| 2002/0039328 | A1 | * | 4/2002 | Dubinsky et al. .............. 367/82 |
| 2002/0043369 | A1 | | 4/2002 | Vinegar et al. ......... 166/250.07 |
| 2003/0072218 | A1 | | 4/2003 | Smith ........................... 367/83 |
| 2004/0246141 | A1 | | 12/2004 | Tubel et al. .............. 340/854.3 |

FOREIGN PATENT DOCUMENTS

| | | |
|---|---|---|
| EP | 773345 A1 | 5/1997 |
| EP | 1193368 A2 | 4/2002 |
| GB | 2374931 A | 4/2001 |

OTHER PUBLICATIONS

U.S. Appl. No. 60/475,441 Tubel, filed Jun. 2003.*

* cited by examiner

*Primary Examiner*—Albert K. Wong
(74) *Attorney, Agent, or Firm*—Rachael A. Stiegel (57) ABSTRACT

A telemetry system having: a pipe; a SCADA box acoustically coupled to the pipe; and a gauge inserted in the pipe, the gauge comprising: an acoustic wave generator; a coupler mechanically connected to the acoustic wave generator, wherein the coupler is engageable and disengageable with the pipe, wherein the coupler defines an acoustic transmission path between the acoustic wave generator and the pipe when engaged with the pipe; and a signal controller in communication with the acoustic wave generator. A method for communicating information in a wellbore from a downhole location to the surface, the method having the following steps: running a downhole gauge into a pipe within the wellbore, wherein the downhole gauge comprise an acoustic wave generator; setting the downhole gauge in the pipe; and communicating an acoustic signal between the downhole gauge and the pipe.

26 Claims, 6 Drawing Sheets

THROUGH TUBING REAL TIME DOWNHOLE WIRELESS GAUGE

FIELD OF THE INVENTION

The present invention relates to oil field communication and telemetry systems. More particularly the invention relates to an acoustic wireless communications system through the production tubing.

BACKGROUND OF THE INVENTION

As new processes for drilling, completion, production, hydrocarbon enhancement, and reservoir management are developed, advancements in technologies related to temperature, pressure, and flow monitoring and downhole device control are required. Reservoir development systems must be constantly monitored to ensure maximum production. For example, with gravel-packed production systems, perforations become clogged over time, so that optimum flow rates are not maintained. To restore the production of the well, it has heretofore been a common practice to pull the entire length of production tubing out of the casing to clear the obstructed tubing perforations, or replace the perforated tubing section, and then re-install the production tubing within the casing. This task is laborious, time-consuming and expensive. Thus, to ensure more efficient production and prevent clogs or blockages, downhole monitor and control systems have been developed. Similar issues arise from artificial lift optimization, reservoir pressure monitoring, etc.

In some systems, surface controllers are hardwired to downhole sensors which transmit information to the surface. For example, wire line production logging tools are used to provide downhole data on pressure, temperature, flow, gamma ray and pulse neutron using a wire line surface unit. The data is processed by surface computer equipment and control signals are then transmitted back down the same wire or an alternative wire to manipulate the operating configuration of the system downhole.

Other downhole control systems use a remote computer control system with microprocessor controllers, electromechanical control devices and sensors. The microprocessor controllers transmit control signals only upon actuation by receipt of an actuation signal from an outside source, such as a surface transmitter.

Downhole control systems interface with surface control systems by both wireless and hardwired transmission mediums. Wireless acoustic signals are transmitted down a tubing string, such as production pipe or coiled tubing. Acoustic transmission is also done through the casing stream, electrical line, slick line, subterranean soil around the well, tubing fluid and annulus fluid. Acoustic transmitters and receivers are well known.

Acoustic downhole control systems require a solid mechanical connection between the transducer and the transmission medium. Thus, acoustic downhole control systems are permanently installed into the downhole apparatus to enable good communication between the acoustic transmitter and the acoustic transmission medium.

A known system for monitoring a formation surrounding a borehole in a production well includes a formation evaluation sensor permanently located downhole in a production well having at least two boreholes, wherein at least one of the boreholes is a branch borehole, the sensor sensing a formation parameter which is not normally present within the borehole. Automatic control is initiated downhole without an initial control signal from the surface or from some other external source. The system has downhole sensors, downhole electromechanical devices, and downhole computerized control electronics whereby the control electronics automatically control the electromechanical devices based on input from the downhole sensors.

The system has sensors which monitor a variety of actual downhole condition parameters, such as pressure, temperature, flow, gas influx, etc. The system is also preprogrammed to determine whether the actual condition parameters fall within an acceptable or optimal range. When the actual environmental conditions fall outside the acceptable or optimal range, the system is preprogrammed to operate a sliding sleeve, shut off device, valve, variable choke, penetrator, perf valve or gas lift tool. The system has a remote power source and operates independently of any control from the surface. Thus, the only way to change the systems operating parameters, is to pull the entire production apparatus, completion system, or drilling apparatus with the incorporated control system from the wellbore, reconfigure the control system, and reinsert the entire apparatus back into the wellbore.

Permanent downhole systems may only be modified, reconfigured or serviced by pulling the entire downhole apparatus out of the wellbore. As noted above, it is laborious, time-consuming and expensive to pull the entire length of production tubing out of the casing to service and re-install a downhole control system. Further, once a permanent downhole control system is installed in a wellbore, the control system is fixed and operates from only one location during the entire time that the production system is in the wellbore. In some applications it is desirable to operate the control system at various locations and for shorter periods of time relative to the life of the entire production system.

SUMMARY OF THE INVENTION

A first aspect of the present invention is a through tubing system which uses electronics, sensors and acoustic generators to acquire production and formation data for communication transmitted through the tubing to the surface.

According to an aspect of the invention, there is provided a gauge for transmitting acoustic signals through a pipe to a receiver, the gauge having: an acoustic wave generator; a coupler mechanically connected to the acoustic wave generator, wherein the coupler is engageable and disengageable with the pipe, wherein the coupler defines an acoustic transmission path between the acoustic wave generator and the pipe when engaged with the pipe; and a signal controller in communication with the acoustic wave generator, wherein the gauge is insertable into the inside diameter of the pipe.

Another aspect of the invention provides a surface system having: a pipe; a SCADA box acoustically coupled to the pipe; and a gauge inserted in the pipe, the gauge having: an acoustic wave generator; a coupler mechanically connected to the acoustic wave generator, wherein the coupler is engageable and disengageable with the pipe, wherein the coupler defines an acoustic transmission path between the acoustic wave generator and the pipe when engaged with the pipe; and a signal controller in communication with the acoustic wave generator.

According to a further aspect of the invention, there is provided a method for communicating information in a wellbore from a downhole location to the surface, the method including the steps of: running a downhole gauge into a pipe within the wellbore, wherein the downhole gauge comprise an acoustic wave generator; setting the downhole gauge in the pipe; and communicating an acoustic signal between the downhole gauge and the pipe.

The objects, features, and advantages of the present invention will be readily apparent to those skilled in the art upon a reading of the description of the preferred embodiments which follows.

BRIEF DESCRIPTION OF THE DRAWINGS

The present invention is better understood by reading the following description of non-limitative embodiments with reference to the attached drawings wherein like parts of each of the several figures are identified by the same referenced characters, and which are briefly described as follows.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

Figure 1:
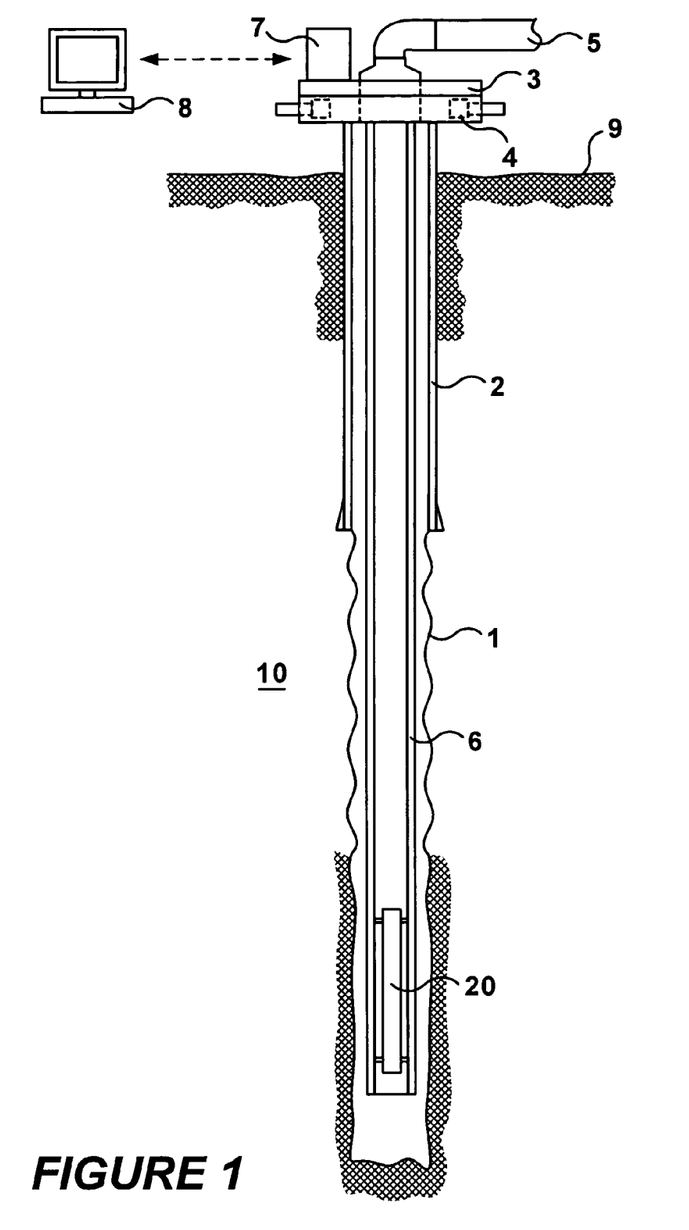
FIG. 1 is a cross-sectional diagram of a wellbore with a wireless elementary system installed therein.

Referring to FIG. 1, a cross-sectional side view of a mineral production well is shown. A wireless wellbore digital data communications and sensing system (wireless telemetry system 10) of the present invention communicates through a production pipe 6 using compressional stress waves to transmit digital data from inside a wellbore 1 to the surface 9. The system is composed of wireless transmission hardware, acoustic generator, microprocessor system for data acquisition, processing and power management, pressure and temperature gauges, a battery pack unit and a surface receiver/transmitter box 7 for surface data acquisition and processing. A description of the basic system, surface module and communications is disclosed in patent application Ser. No. 10/381,766, incorporated herein by reference. The surface receiver/transmitter box 7 may operate using SCADA software. The acoustic waves travel up the production pipe 6 to the surface 9 in a compression mode minimizing losses related to fluid coupling and tubing threads. The data is detected at the surface 9 using accelerometers or hydrophones. The data is processed using a surface data processing unit. The information is then displayed and stored in a personal computer 8 that interfaces to the surface system.

In particular, the wellbore 1 extends below the earth's surface 9. Casing 2 is installed in the wellbore 1 and extends from the surface 9 down into the wellbore 1. A wellhead 3 is attached to the casing 1 above the surface 9. The wellhead 3 is equipped with a blow out preventer 4, in typical fashion. A flow line 5 extends from the wellhead 3 for withdrawing production fluids from the well. The production pipe 6 extends from the wellhead 3, down through the casing 2 and into the lowest portion of the wellbore 1.

The wireless telemetry system 10 of the present invention is shown installed in the wellbore 1. In particular, the receiver/transmitter box 7 is attached to the wellhead 3 for receiving acoustic transmissions through the wellhead. The receiver/transmitter box 7 communicates with a computer 8 via any means of transmission. For example, these devices may be connected by cables, wires, infrared, LED, microwave, acoustic, or any other transmission medium.

The wireless telemetry system 10 also comprises a downhole gauge 20 which is installed in the inside diameter of the production pipe 6. Communications between the downhole gauge 20 and the receiver/transmitter box 7 may be accomplished by any wireless transmission method, including: acoustic waves, acoustic stress waves, optical, electro-optical, electrical, electromechanical force, electromagnetic force ("EMF"), any combination of these, or any other transmission medium. The wireless data communication may be one way or bi-directional.

Where acoustic telemetry devices are used to transmit communication signals, vibration frequencies are used that are unaffected by pump noise or other noise in the system. In one embodiment, piezo wafers are used to generate the acoustic signal. Alternatively, magneto-restrictive material may be used to generate the acoustic signal. The receiver/transmitter box 7 may also comprise a transceiver which receives acoustic signals transmitted from the downhole gauge 20 up through the production pipe 6. The transceiver may include both data receivers and data transceivers which may be of any type known to persons of skill in the data transmission art.

Depending on the depth of the wellbore 1, one or more repeaters (not shown in the figures) may be positioned at various intervals between the downhole gauge 20 and the receiver/transmitter box 7. In one embodiment of the invention, the acoustic downhole gauge 20 has a transmission range of 8,500 feet without a repeater, transmitting at 7 bits per second.

The wireless telemetry system 10 may be used to monitor downhole production pressures and temperatures using wireless communications. The system may also provided a reliable transmission system for digital data from downhole to the surface using the production pipe 6 as the medium for data transfer. Further, the system may be installed at relatively low cost, because the need to pull tubing from the well is eliminated, for example, the tool may be lowered in the wellbore through the inside of the tubing. The system also provides real time communications that allow an operator to maintain complete control of the production of hydrocarbon by monitoring the downhole data. Depending on the embodiment of the invention, the tool may be retrieved from the wellbore using wireline, slickline or coil tubing. Cables, clamps, feedthrough connectors and wellhead penetrators are not required with the system of the present invention.

Figure 2:
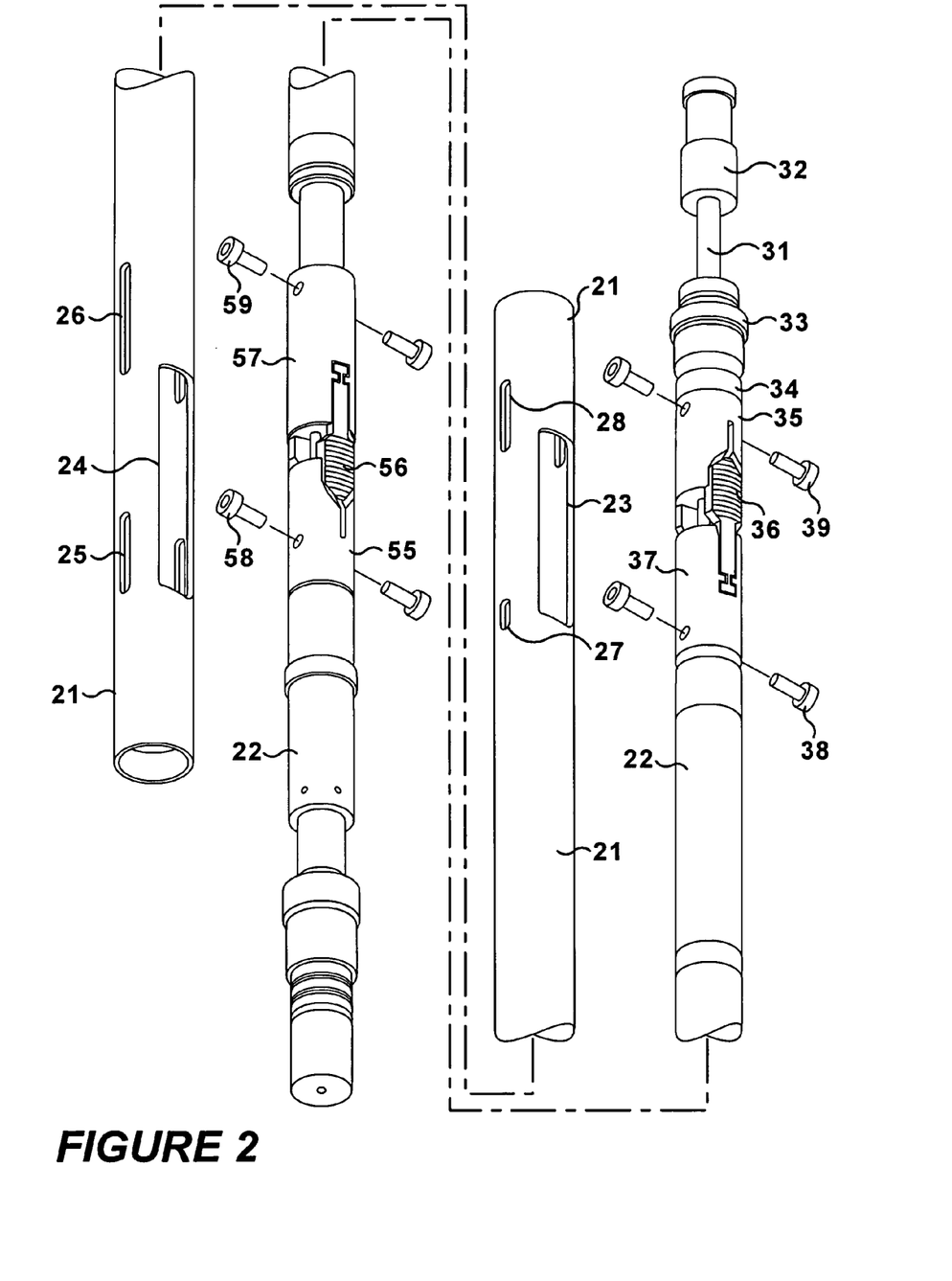
FIG. 2 is an exploded, perspective view of a downhole gauge wherein a sleeve is disassembled from a main body.

Referring to FIG. 2, a perspective view of the downhole gauge 20 is shown with a sleeve 21 disassembled from a main body 22. The main body 22 contains sensors, electronic equipment, and acoustic signal generators. It is also made up of various components for setting the downhole gauge 20 in the production pipe 6 so that an acoustic signal may be communicated from the downhole gauge 20 to the production pipe 6. The sleeve 21 is slidingly mounted to the exterior of the main body 22 and connected by shear pins 38, 39, 58, 59. Shear pins 58 mate with slots 25, shear pins 59 mate with slots 26, shear pins 38 mate with slots 27, and shear pins 39 mate with slots 28, as described more fully below. The main body 22 has two sets of slips, upper slips 36 and lower slips 56. When the sleeve 21 is assembled on the main body 22, the upper and lower slips 36 and 56 are exposed through upper and lower windows 23 and 24, respectively.

Figure 3:
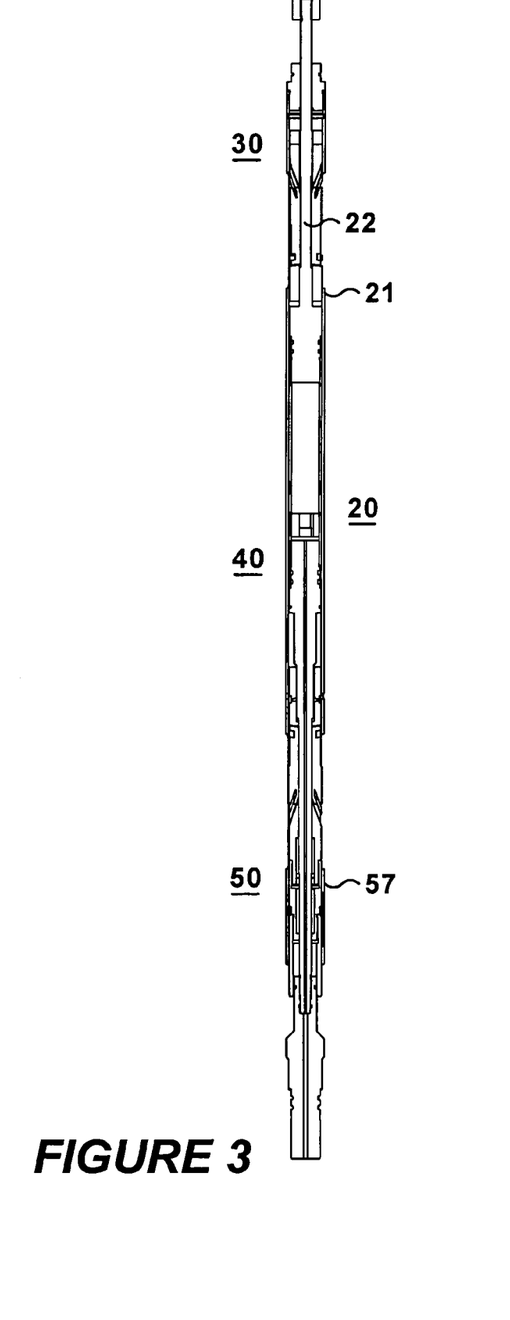
FIG. 3 is a cross-sectional, side view of a downhole gauge with the sleeve assembled to the main body, wherein three sections are identified: an upper section, a middle section, and a lower section.

Referring to FIG. 3, a cross-sectional side view of the downhole gauge 20 is shown with the sleeve 21 assembled with the main body 22. The downhole gauge 20 is described herein with reference to three sections, including: an upper section 30, a middle section 40, and a lower section 50.

Figure 4:
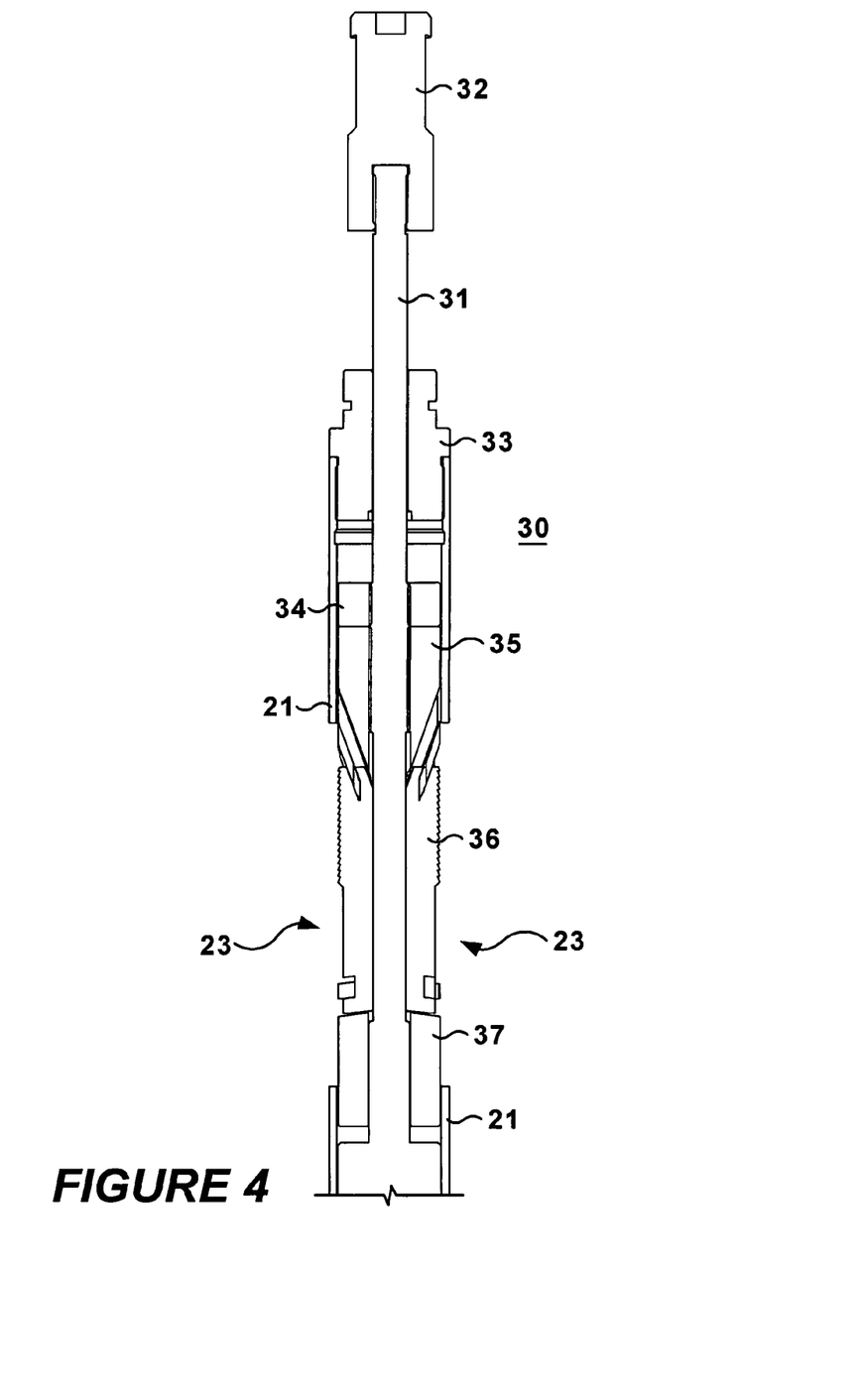
FIG. 4 is an enlarged, cross-sectional, side view of the upper section of the downhole gauge shown in FIG. 3.

Referring to FIG. 4, an enlarged, cross-sectional, side view of the upper section 30 of the downhole gauge 20 is shown. The upper section 30 has an upper sub 31 to which many components are attached. A fishing neck 32 is attached to the upper end of the upper sub 31. Below the fishing neck 32, an upper cone 35 is assembled to the upper sub 31. A cone lock nut 34 is threaded onto the upper sub 31 immediately behind the upper cone 35. An upper end cap 33 is slidingly attached to the upper sub 31 between the cone lock nut 34 and the fishing neck 32. The upper sub 31 is sufficiently long to allow the upper end cap 33 to slide in the axial direction between the fishing neck 32 and the cone lock nut 34. The sleeve 21 is attached to the upper end cap 33. Upper slips 36 are set in an upper connector ring 37, wherein the upper connector ring 37 is slidingly mounted on the upper sub 31. As shown in FIG. 2, shear pins 38 mate with slots 27 to connect the upper connector ring 37 to the sleeve 21. As shown in FIG. 4, when the sleeve 21 is assembled with the main body 22, the upper slips 36 are exposed through upper windows 23 in the sleeve 21.

Figure 5:
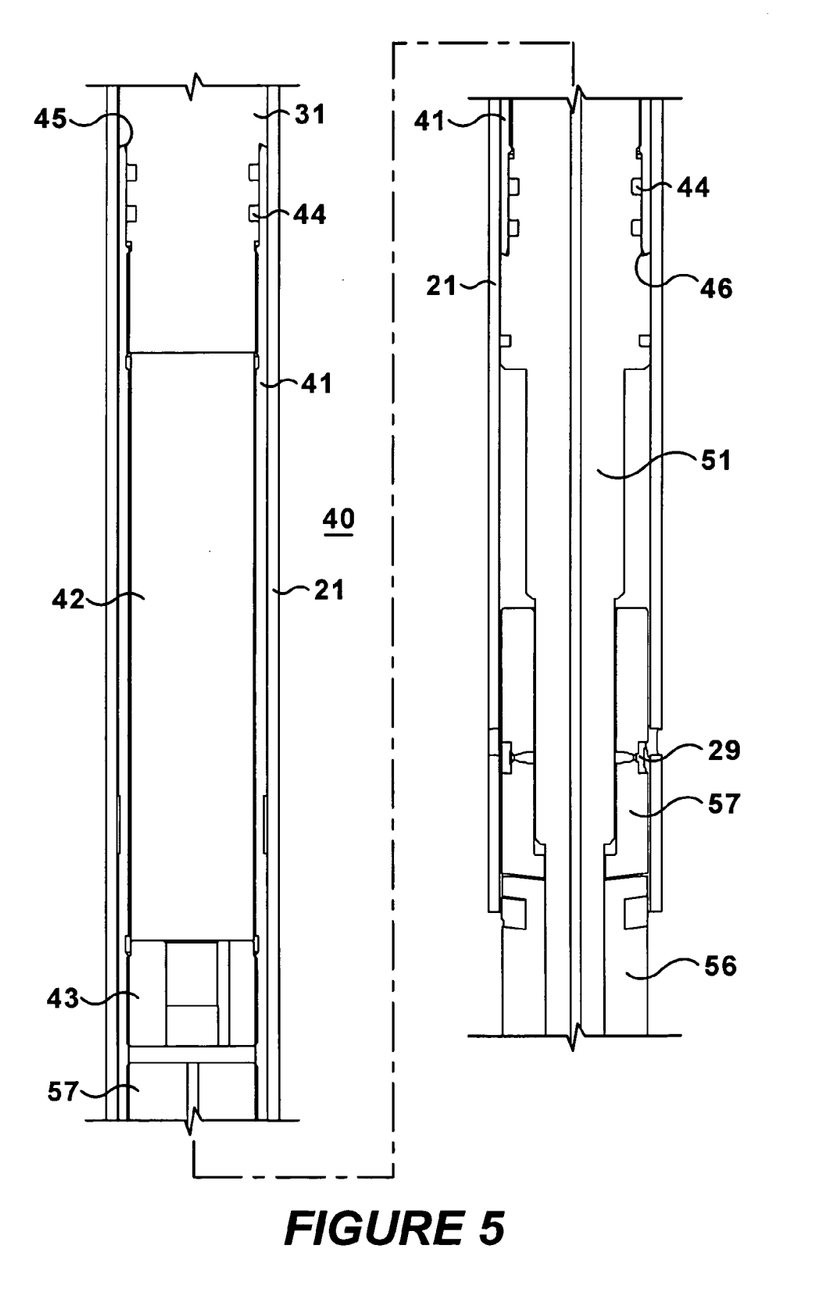
FIG. 5 is an enlarged, cross-sectional, side view of the middle section of the downhole gauge shown in FIG. 3.

Referring to FIG. 5, an enlarged cross-sectional side view of the middle section 40 of the downhole gauge 20 is illustrated. The bottom portion of the upper sub 31 extends into the top of the middle section 40, and the upper portion of a lower sub 51 extends into the bottom of the middle section 40. The upper sub 31 and the lower sub 51 are structurally connected to each other by a spacer tube 41. The spacer tube 41 mates with both the upper sub 31 and the lower sub 51 so as to transmit compressive forces between the subs. In particular, ends of the spacer tube 41 are tapered so that spacer tube 41 is longer at the inside diameter than at the outside diameter. The tapered ends of the spacer tube 41 mate with shoulders 45 and 46 in the upper sub 31 and lower sub 51, respectively. The shoulders 45 and 46 are angled toward the spacer tube 41 so that when the spacer tube 41 is compressed between the upper sub 31 and the lower sub 51, the ends of the spacer tube 41 are retained by the shoulders 45 and 46. The sleeve 21 is shown assembled concentrically around the outside of the other components.

A piezoelectric crystal 42 is positioned within the spacer tube 41 in direct contact with the bottom surface of the upper sub 31. A lock hub 43 abuts against the lower end of the piezoelectric crystal 42 and locks or threads into the spacer tube 41. Thus, the piezoelectric crystal 42 is securely squeezed between the upper sub 31 and the lock hub 43. Because the piezoelectric crystal 42 is compressed between the upper sub 31 and the lock hub 43, acoustic signals from the piezoelectric crystal 42 are effectively transmitted to the upper sub 31 and spacer tube 41. Seals 44 are positioned between the upper sub 31 and the spacer tube 41. Similarly, seals 44 are position between the lower sub 51 and the spacer tube 41, so that the interior of the spacer tube 41 is isolated from formation fluids.

A lower connector ring 57 is positioned concentrically about the lower sub 51. The lower sub 51 has two shoulders for engaging the lower connector ring 57. The lower connector ring 57 has a flange which extends radially inward to engage a shoulder of the lower sub 51, so that the upper end of the lower connector right 57 engages one of the shoulders on the lower sub 51 and the flange engages the other shoulder of the lower sub 51. The shoulders on the lower sub 51 limit movement by the lower connector ring 57 in the upward, axial direction.

Figure 6:
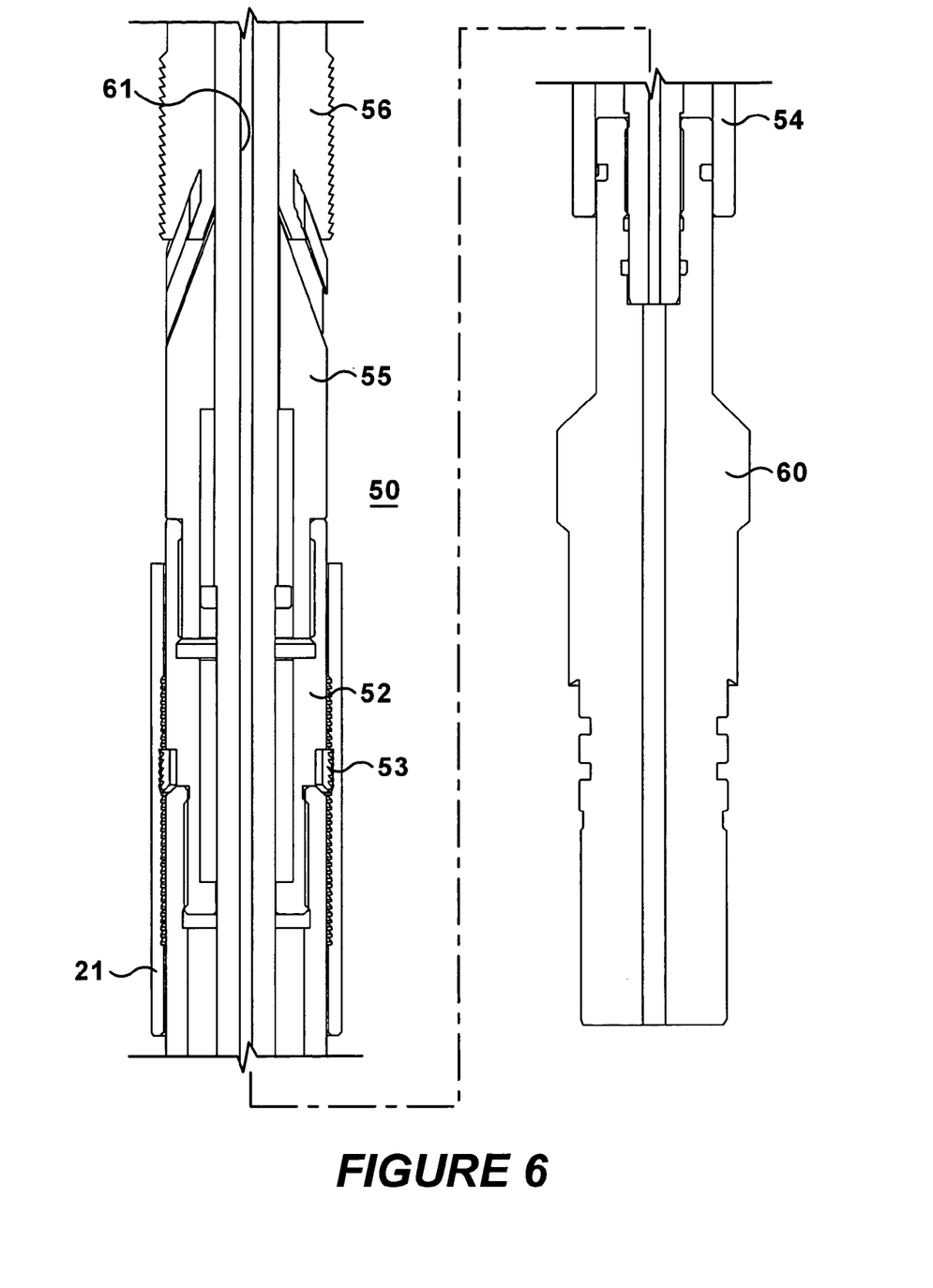
FIG. 6 is an enlarged, cross-sectional, side view of the lower section of the downhole gauge shown in FIG. 3.

Referring to FIG. 6, an enlarged cross-sectional side view of the lower section 50 of the downhole gauge 20 is shown. Lower slips 56 are retained in the lower connector ring 57 on opposite sides of the lower sub 51. A lower cone 55 is positioned concentrically about the lower sub 51 below the lower connector ring 57 and lower slips 56. As shown in FIG. 2, the lower slips 56 are exposed by the sleeve 21 through lower windows 24. Further, shear pins 58 extend from the lower cone 55 through slots 25 to connect the lower cone 55 to the sleeve 21. Shear pins 59 extend from the lower connector ring 57 through slots 26 to connect the lower connector right 57 to the sleeve 21.

Referring again to FIG. 6, the lower section 50 also includes a spring holder 52 which is positioned below the lower cone 55. A ratchet ring 53 resides concentrically in an exterior recess of the spring holder 52. The ratchet spring 53 is biased so as to expand radially outward from the spring holder 52. Further, the ratchet spring 53 has teeth on its exterior surface to engage with teeth on the interior surface of the sleeve 21. When the sleeve 21 is moved in an upward, axial direction relative to the spring holder 52, the ratchet spring 53 jumps over the teeth on the sleeve 21. However, the ratchet spring 53 engages the teeth to prevent the sleeve 21 from moving in a downward, axial direction relative to the spring holder 52.

The lower section 50 also has an electronics module 54 which is positioned below the spring holder 52. A cross-over tool 60 is attached to the bottom of the electronics module 54. The lower sub 51 has a hollow bore 61 which extends along the entire longitudinal axis. The hollow bore 61 enables electrical conductors to pass through the lower sub 51 from the electronics module 54 and cross-over tool 60 up to the piezoelectric crystal 42. Thus, command signals from the electronics module 54 are communicated to the piezoelectric crystal 42 through the lower sub 51. The cross-over tool 60 also contains batteries, a transformer, and a data acquisition module. The electronics module 54 may be located in a separate housing from the slip section in alternative embodiments. The electronics module 54 is composed of a microprocessor circuit, analog to digital converter section and an acoustic generator drive.

The downhole gauge 20 is run into the production pipe 6 on a setting tool (not shown), such as an E4 setting tool or hydraulic setting tool. In the run-in position, the upper sub 31 is extended from the upper end cap 33 and the upper slips 36 and lower slips 56 are retained within the windows 23 and 24 of the sleeve 21. When the downhole gauge 20 reaches a desired location within the production pipe 6, the operator sets the downhole gauge 20 by manipulating the setting tool (not shown). The setting tool pushes downward on the fishing neck 32 and pulls upward on the upper end cap 33 so that upper sub 31, spacer tube 41, and lower sub 51 move downwardly relative to the sleeve 21. This relative movement causes the upper slips 36 to ride up the upper cone 35 and the lower slips 56 to ride up the lower cone 55. Thereby, the slips 36 and 56 are pushed radially outward by the cones 35 and 55 to engage the slips 36 and 56 with the inside diameter of the production pipe 6. The lengths of the slots 25, 26, 27 and 28 are precisely defined to ensure that both the upper and lower slips 36 and 56 engage the production pipe 6 while the upper and lower subs 31 and 51 are compressed between.

In particular, slots 28 and 26 are long enough to allow sleeve 21 to move freely in the longitudinal direction to set the slips. Thus, the shear pins 39 and 59 extend into the slips 28 and 26 to restrict rotational movement by the sleeve 21, but not axial movement. Slots 27 are shorter than slots 25 so that the upper slips 36 are set before the lower slips 56. In particular, as the sleeve 21 moves upwardly relative to the main body 22, the shear pins 38 are first engage by in the slots 27 to lift the upper connector ring 37. After the upper slips have already begun to expand radially over the upper cone 35, the shear pins 58 are engaged by the slot 25 to lift the lower cone 55 and set the lower slips 56. Also, when the lower cone 55 slides upward relative to the lower connector ring 57 and lower slips 56, the lower cone 55 exerts an upward force on the lower sub 31 through the lower connector ring 57. As noted above, the lower connector ring 57 engages shoulders on the lower sub 51. This upward force further compresses the spacer tube 41 between the upper and lower subs 31 and 51 to ensure that acoustic waves generated by the piezoelectric crystal 42 are effectively conducted through the subs 31 and 51, to the slips 36 and 56, and into the production pipe 6.

The downhole gauge 20 is locked in the "set" configuration by the ratchet spring 53. As the sleeve 21 moves upwardly relative to the spring holder 52, the ratchet spring 53 jumps over the teeth on the inside of the sleeve 21. Thus, when the downhole gauge 20 is fully set in the production pipe 6, the ratchet spring 53 engages the teeth on the inside of the sleeve 21 to retain the downhole gauge 20 in a "set" configuration.

The downhole gauge 20 may use two sets of slips for multiple functions. They are used to hold the tool in place by securing the tool against the production pipe 6. The upper slips 36 prevent the gauge from moving downwards while the lower slips 56 prevent the gauge from moving upwards. The second function of the slips is to couple the acoustic signals from the tool to the production pipe 6. The slips exert a significant amount of force against the gauge to hold the gauge in place. In one embodiment of the invention, the force is created by springs located inside the gauge that are compressed when the setting tool pulls the upper end cap 33 of the gauge while pushing the fishing neck 32. Set screws located in the sleeve are sheared by the setting forces allowing the slips to be released from the tool. In alternative embodiments of the invention, as single set of upper slips are used with no lower slips, or a single set of lower slips are used with no upper slips.

In some embodiments of the invention, the outside diameter of the downhole gauge 20 is sufficiently smaller than the inside diameter of the production pipe 6 to allow production fluids to flow through the production pipe 6 even after the downhole gauge 20 is installed. For production pipe sizes between 2⅞ inches and 3½ inches, the outside diameter of the downhole gauge 20 may be about 2.08 inches. In one embodiment of the invention, the gauge is about 12 feet long.

The downhole gauge 20 may also comprise sensors 29. As shown in FIG. 5, the sensors 29 may be located in the lower connector ring 57. Alternatively, the sensors 29 may be deployed at predetermined locations in the wellbore 1. For example, the sensors 29 may be embedded in the production pipe 6 or may be connected to the downhole gauge 20 by wire lines. Further, multiple wireless tools, sensors, and gauges may be deployed in the production pipe 6 which may be controlled by the downhole gauge 20. The downhole gauge 20 may communicate with these devices by a variety of data transmission techniques which are known. In particular, each tool, sensor, and gauge may have a unique data address for communication via single channel or broadband transmission. Further, master/slave data communications may be used to communicate with individually addressed tools, sensors, and gauges. Alternatively, different data transmission frequencies may be used to communicate with individual tools, sensors, and gauges in a broadcast transmission scheme.

Tools, sensors, and gauges may be used to monitor physical characteristics of the wellbore 1, the surrounding formation, and fluids passing through the production pipe 6. Physical characteristics include temperature, pressure and flow rates. The sensors may comprise fiberoptic sensors, which monitor oil, water, or gas. Alternative sensors capable of monitoring chemical, mechanical, electrical or heat energy may also be used. Further, the sensors may also monitor pressure, temperature, fluid flow, fluid type, resistivity, cross-well acoustics, cross-well seismic, perforation depth, fluid characteristics, logging data, and vibration. The sensors themselves may be magneto-resistive sensors, piezoelectric sensors, quartz sensors, fiberoptic sensors, sensors fabricated from silicon on sapphire, or any other sensor known. A sapphire pressure gauge may be used. Pressure gauges capable of monitoring pressures between 0 and 15,000 psi with a pressure gauge resolution of 1.2 psi for a 5,000 psi gauge (0.3 psi resolution, alternative) may be used. For temperature sensors, temperature compensation may be built into the tool.

The electronics module 54 may comprise a data acquisition tool which obtains data from the sensors and gauges. It may also comprise volatile or nonvolatile memory which stores data gathered from the sensors or gauges, or processes data to be transmitted. The memory may also be used to buffer data for transmission protocols. In one embodiment, 500 kilobytes of random access memory is provided.

One embodiment of the invention enables through tubing deployment and retrievability capabilities reducing installation costs using a downhole gauge to production pipe mechanical coupling. An embodiment of the invention uses a broadband transmission technique that is immune to the acoustic impedance of the tubing i.e., the system will operate properly in most well conditions without the need to tune the transmission system. The transmission system is immune from pump noise.

One embodiment of the downhole gauge utilizes extremely low power electronics requiring electrical current consumption of less than 100 micro amps during sleep mode. This extends battery life expectancy to 3 years with a 30 Ampere-Hour battery pack. High efficiency acoustic power generator technology may be used that extends the life of the battery pack to 3 years with transmission every 2 minutes. In particular, high efficiency communications encoding to reduce the number of bits transmitted to the surface from downhole minimizes battery power utilization. High speed data rate may also be used to provide a data point update every 4 seconds. The battery pack may utilize solid lithium technology that is safe for surface handling. A description of a battery pack is disclosed in patent application Ser. No. 10/381,766, incorporated herein by reference.

In some embodiments of the invention, all components, including electrical components are capable of operation in temperatures between −20 and 125 degrees Celsius. These embodiments may also be able to withstand external pressures of 10,000 psi. The downhole gauge may be operated in a wellbore, transmitting data for 3 years with a single battery pack.

The downhole gauge can be retrieved from the wellbore by releasing the slips from the pipe. The fishing neck located on the top of the downhole gauge can be latched to a retrieval tool on wireline, slickline or electric line allowing a surface unit to pull the tool. The slips may be released when shear screws located on the lower section of the tool are ruptured.

A downhole gauge of the invention was set in 2⅞ inch tubing, at a position 500 feet below the surface. The tubing was full of water and there was no other noise in the system. After the downhole gauge was set in the tubing, the downhole gauge monitored temperature and pressure and acoustically transmitted results to the surface through the tubing. The gauge updated the temperature and pressure data every 30 seconds for about 48 minutes. The system used an XP-IO personal computer program (version 85556TA250) bedded with XP-IO (version 75099TH100). A surface system and a personal computer to acquire and process the data received from the downhole tool. Throughout the entire test, the downhole gauge transmitted a temperature of 86.6 degrees F. For the first fourteen minutes and the last twenty-eight minutes, the downhole gauge transmitted a pressure of 124.55 psi. Between minutes fourteen and twenty-eight, the downhole gauge transmitted a pressure of 123.45 psi.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A gauge for transmitting acoustic signals through a pipe to a receiver, the gauge comprising:
    an acoustic wave generator;
    a coupler mechanically connected to the acoustic wave generator, wherein the coupler is engageable and disengageable with the pipe, wherein the coupler defines an acoustic transmission path between the acoustic wave generator and the pipe when engaged with the pipe; and
    a signal controller in communication with the acoustic wave generator, wherein the gauge is insertable into the inside diameter of the pipe;
    wherein the coupler comprises:
        a slip comprising a production pipe engaging surface; and
        a wedge comprising a tapered surface in sliding contact with the slip, whereby the wedge forces the slip into engagement with the production pipe as the wedge slides relative to the slip.

2. A gauge as claimed in claim 1, wherein the acoustic wave generator comprises a piezoelectric crystal.

3. A gauge as claimed in claim 1, wherein the acoustic wave generator comprises a piezo wafer.

4. A gauge as claimed in claim 1, wherein the acoustic wave generator comprises a magneto-restrictive material.

5. A gauge as claimed in claim 1, wherein the coupler comprises:
    a sub extending along the longitudinal central axis of the gauge;
    a cone attached concentrically to the sub;
    a connector ring slidingly mounted to the sub; and
    at least one slip mounted in a recess of the connector ring, wherein relative movement of the cone and connector ring causes the cone to push the at least one slip in a radial-outward direction.

6. A gauge as claimed in claim 1, wherein the coupler comprises:
    a first set of slips positioned at one end of the acoustic wave generator;
    a second set of slips positioned at an opposite end of the acoustic wave generator;
    a setting mechanism mechanically connected to the first and second sets of slips, wherein the setting mechanism acoustically couples the acoustic wave generator to the first and second sets of slips when the setting mechanism sets the slips.

7. A gauge as claimed in claim 1, wherein the coupler comprises:
    an upper sub extending along the longitudinal central axis of the gauge;
    an upper cone attached concentrically to the upper sub;
    an upper connector ring slidingly mounted to the upper sub;
    at least one upper slip mounted in a recess of the upper connector ring;
    a lower sub extending along the longitudinal central axis of the gauge;
    a lower cone slidingly mounted to the lower sub;
    a lower connector ring attached to the lower sub;
    at least one lower slip mounted in a recess of the lower connector ring,
    an outer sleeve in mechanical communication with the lower cone
    wherein relative movement of the upper sub and the outer sleeve causes the at least one upper slip and the at least one lower slip to move radially outward and causes the upper sub and the lower sub to be pushed toward each other.

8. A gauge as claimed in claim 1, wherein the coupler comprises:
    a first set of slips mechanically connected to the acoustic wave generator;
    a second set of slips mechanically connected to the acoustic wave generator;
    a setting mechanism mechanically connected to the first and second sets of slips, wherein the setting mechanism sets the first set of slips before it sets the second set of slips.

9. A gauge as claimed in claim 1, wherein the coupler comprises:
    an upper sub;
    a holding device connected to the upper sub which holds the acoustic wave generator in contact with the upper sub;
    a lower sub in contact with the holding device; and
    an outer sleeve mechanically connected to the lower sub, wherein the upper sub, the holding device and the lower sub are positioned within the outer sleeve,
    wherein relative movement of the outer sleeve and the upper sub compresses the acoustic wave generator between the upper and lower subs.

10. A gauge as claimed in claim 1, wherein the signal controller comprises a microprocessor, an analog to digital converter, and an acoustic generator drive.

11. A gauge as claimed in claim 1, further comprising a sensor in communication with the signal controller.

12. A gauge as claimed in claim 11, wherein said sensor monitors a parameter selected from the group of parameters consisting of chemical energy, mechanical energy, electrical energy, heat energy, pressure, temperature, fluid flow, fluid type, resistivity, cross-well acoustics, cross-well seismic, perforation depth, fluid characteristics, logging data, and vibration.

13. A gauge as claimed in claim 11, wherein said sensor comprises a sensor selected from the group of sensors consisting of magneto-resistive sensors, piezoelectric sensors, quartz sensors, fiberoptic sensors, and sensors fabricated from silicon on sapphire.

14. A gauge as claimed in claim 1, further comprising a downhole tool in communication with the signal controller.

15. A gauge as claimed in claim 11, wherein said downhole tool comprises a tool selected from a group of tools consisting of a valve, a pump, a hydraulic lift tool, a packer, a cross-over tool, and a motor, a sliding sleeve, a shut off device, a variable choke, a penetrator, a perf valve, and a gas lift tool.

16. A telemetry system comprising:
a pipe;
a SCADA box acoustically couple to the pipe;
a gauge inserted in the pipe, the gauge comprising:
    an acoustic wave generator and
    a coupler, wherein the coupler includes a slip comprising a production pipe engaging surface and a wedge comprising a tapered surface in sliding contact with the slip, whereby the wedge forces the slip into engagement with the production pipe as the wedge slides relative to the slip,
wherein the coupler is engageable and disengageable with the pipe, wherein the coupler defines an acoustic transmission path between the acoustic wave generator and the pipe when engaged with the pipe; and
a signal controller in communication with the acoustic wave generator.

17. A telemetry system as claimed in claim 16, wherein the acoustic wave generator comprises a piezoelectric crystal.

18. A telemetry system as claimed in claim 16, wherein the coupler comprises:
an upper sub;
a holding device connected to the upper sub which holds the acoustic wave generator in contact with the upper sub;
a lower sub in contact with the holding device; and
an outer sleeve mechanically connected to the lower sub, wherein the upper sub, the holding device and the lower sub are positioned within the outer sleeve,
wherein relative movement of the outer sleeve and the upper sub compresses the acoustic wave generator between the upper and lower subs.

19. A method for communicating information in a wellbore from a downhole location to the surface, the method comprising:
running a downhole gauge into a pipe within the wellbore, wherein the down hole gauge comprises an acoustic wave generator;
running a coupler into the pipe; wherein the coupler comprises:
    a slip comprising a production pipe engaging surface; and
    a wedge comprising a tapered surface in sliding contact with the slip, whereby the wedge forces the slip into engagement with the production pipe as the wedge slides relative to the slip;
setting the downhole gauge in the pipe; and communicating an acoustic signal between the downhole gauge and the pipe.

20. A method as claimed in claim 19, wherein the setting comprises:
engaging at least one sets of slips with the pipe; and
compressing the acoustic wave generator between the at least one sets of slips.

21. A method as claimed in claim 19, wherein the setting comprises establishing an acoustic transmission path between the acoustic wave generator and the pipe.

22. A method as claimed in claim 19, wherein the communicating an acoustic signal between the downhole gauge and the pipe comprises transmitting a signal representing a parameter selected from the group of parameters consisting of chemical energy, mechanical energy, electrical energy, heat energy, pressure, temperature, fluid flow, fluid type, resistivity, cross-well acoustics, cross-well seismic, perforation depth, fluid characteristics, logging data, and vibration.

23. A method as claimed in claim 19, further comprising communicating an acoustic signal between the pipe and a SCADA box.

24. A method as claimed in claim 23, wherein the communicating an acoustic signal between the pipe and a SCADA box comprises transmitting a control signal for a downhole tool selected from the group of downhole tools consisting of a valve, a pump, a hydraulic lift tool, a packer, a cross-over tool, and a motor.

25. A method as claimed in claim 19, further comprising controlling a downhole tool with the downhole gauge.

26. A method as claimed in claim 25, wherein said downhole tool comprises a tool selected from a group of tools of a valve, a pump, a hydraulic lift tool, a packer, a cross-over tool, and a motor, a sliding sleeve, a shut off device, a variable choke, a penetrator, a perf valve, and a gas lift tool.

* * * * *